(12) United States Patent
Zhang et al.

(10) Patent No.: US 12,021,824 B2
(45) Date of Patent: Jun. 25, 2024

(54) ADDRESS MANAGEMENT METHOD, APPARATUS, AND SYSTEM

(71) Applicant: Huawei Technologies Co., Ltd., Guangdong (CN)

(72) Inventors: Lianjing Zhang, Nanjing (CN); Xueting Xia, Nanjing (CN); Hui Guo, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/190,520

(22) Filed: Mar. 27, 2023

(65) Prior Publication Data

US 2023/0246994 A1    Aug. 3, 2023

Related U.S. Application Data

(63) Continuation of application No. PCT/CN2021/120440, filed on Sep. 24, 2021.

(30) Foreign Application Priority Data

Sep. 28, 2020 (CN) .......................... 202011043850.1

(51) Int. Cl.
*H04L 61/2514* (2022.01)
*H04L 61/5014* (2022.01)
*H04L 61/5061* (2022.01)

(52) U.S. Cl.
CPC ...... *H04L 61/2514* (2013.01); *H04L 61/5014* (2022.05); *H04L 61/5061* (2022.05)

(58) Field of Classification Search
CPC ............. H04L 61/2514; H04L 61/5014; H04L 61/5061
See application file for complete search history.

(56) References Cited

U.S. PATENT DOCUMENTS

2017/0026283 A1\*  1/2017  Williams ............. H04L 61/2517
2022/0377043 A1\*  11/2022  Yang ..................... H04M 15/66

FOREIGN PATENT DOCUMENTS

CN         105704042 A      6/2016
CN         105939327 A      9/2016
              (Continued)

OTHER PUBLICATIONS

TR-384, Cloud Central Office Reference Architectural Framework, Issue: 1, Issue Date: Jan. 2018, total 80 pages.
(Continued)

*Primary Examiner* — Bryan Y Lee
(74) *Attorney, Agent, or Firm* — WOMBLE BOND DICKINSON (US) LLP

(57) ABSTRACT

This application discloses an address management method for a virtual broadband gateway (vBNG) in which a user plane and a control plane are separated. A user plane device receives a first packet that includes a private address of a terminal, the user plane device is provided with a public address pool and/or a port number corresponding to each public address in the public address pool. The user plane device generates address translation information of the terminal, where the address translation information of the terminal includes the private address, a public address in the public address pool, and a port number range, the address translation information of the terminal is used by the user plane device to translate an address of a service packet, and the service packet is a packet from the terminal or a packet to be sent to the terminal.

20 Claims, 8 Drawing Sheets

(56) References Cited

FOREIGN PATENT DOCUMENTS

| CN | 111147426 | A | 5/2020 |
|----|-----------|----|--------|
| CN | 111586670 | A | 8/2020 |
| EP | 2665335 | A1 | 11/2013 |
| EP | 3185516 | A1 | 6/2017 |

OTHER PUBLICATIONS

Broadband Forum:"TR-459 Control and User Plane Separation for a disaggregated BNG" 3GPP Draft; C4-203064 3rd Generationpartnership Project (3GPP) Mobile Competence Centr;650 Route Des Lucioles;F-06921 Sophia-Antipolis Cedex; FranceMay 14, 2020 (May 14, 2020) XP052331094, total:103pages.
3GPP TS 29.244 V0.3.0, 3rd Generation Partnership Project; Technical Specification Group Core Network and Terminals;Interface between the Control Plane and the User Plane of EPC Nodes;Stage 3(Release 14), Nov. 2016. 47 pages.
S. Hu et al.,"RFC 8772 The China Mobile, Huawei, and ZTE Broadband Network Gateway (BNG) Simple Control and User Plane Separation Protocol (S-CUSP)",total:May 2020,total:124pages.

* cited by examiner

ADDRESS MANAGEMENT METHOD, APPARATUS, AND SYSTEM

CROSS-REFERENCE TO RELATED APPLICATIONS

This application is a continuation of International Application No. PCT/CN2021/120440, filed on Sep. 24, 2021, which claims priority to Chinese Patent Application No. 202011043850.1, filed on Sep. 28, 2020. The disclosures of the aforementioned applications are hereby incorporated by reference in their entireties.

TECHNICAL FIELD

This application relates to the field of communication technologies, and in particular, to an address management method, apparatus, and system.

BACKGROUND

Control and forwarding of a virtual broadband network gateway (vBNG) are separated, that is, the vBNG is divided into one virtual broadband network gateway control plane (vBNG-CP) device and at least one virtual broadband network gateway user plane (vBNG-UP) device. The vBNG-CP device manages the at least one vBNG-UP device. The vBNG-CP device and the vBNG-UP device are different devices.

Each vBNG-UP device is configured to connect a backbone network and an access network, where the access network is used by a terminal to access, and the backbone network is an upper-layer network of the access network. In this way, the terminal located in the access network can be connected to the backbone network by using the vBNG-UP device. The vBNG-UP device is configured to translate a service packet, and the service packet is a packet from the terminal or a packet to be sent to the terminal. Currently, the terminal uses a private address in the access network, and uses a public address in the backbone network. When receiving the service packet, the vBNG-UP device translates an address of the service packet by using address translation information of the terminal, and then forwards a translated service packet.

Before the address of the service packet is translated, the address translation information of the terminal needs to be obtained first. This application provides a method to obtain the address translation information of the terminal.

SUMMARY

This application provides an address management method, apparatus, and system, to provide a manner of obtaining address translation information. The technical solutions are as follows:

According to a first aspect, this application provides an address management method. The method is applied to a virtual broadband gateway vBNG whose user plane and control plane are separated. In the method, a user plane device receives a first packet, where the first packet includes a private address of a terminal, the user plane device is provided with a public address pool and/or a port number corresponding to each public address in the public address pool, and the user plane device is located on the user plane; and the user plane device generates address translation information of the terminal, where the address translation information of the terminal includes the private address, a public address in the public address pool, and a port number range, the address translation information of the terminal is used by the user plane device to translate an address of a service packet, and the service packet is a packet from the terminal or a packet to be sent to the terminal.

The user plane device is provided with the public address pool and/or the port number corresponding to each public address in the public address pool, and the user plane device generates the address translation information of the terminal and translates the address of the service packet. Therefore, the user plane device has a function of managing the public address pool and/or the port number, a function of generating the address translation information, and an address translation function, that is, the three functions are integrated into one user plane device for execution. In this way, the user plane device does not need to exchange a large quantity of standardized interface messages with a virtual broadband network gateway control plane (vBNG-CP) device, so that a large quantity of network resources are saved. In addition, because the three functions are integrated into the user plane device, the user plane device generates the address translation information of the terminal by using a new method, and a new manner of obtaining the address translation information is provided.

In an embodiment, the user plane device is a virtual broadband network gateway user plane vBNG-UP device, and the user plane device applies for the public address pool to a vBNG-CP device. In this way, the user plane device is provided with the public address pool, thereby having a function of managing the public address pool.

In another embodiment, the user plane device sends a node report request to the vBNG-CP device, where the node report request includes an identifier of the public address pool. The user plane device receives a node report response sent by the vBNG-CP device, where the node report response includes the public address pool. In this way, the user plane device can apply for the public address pool, to obtain a function of managing the public address pool.

In another embodiment, the first packet further includes a translation identifier. The user plane device generates the address translation information of the terminal based on an indication of the translation identifier.

In another embodiment, the first packet is a session establishment request sent by the vBNG-UP device.

In another embodiment, the user plane device sends a release request to the vBNG-CP device, where the release request includes the public address pool, and the release request is used by the vBNG-CP device to reclaim the public address pool.

In another embodiment, the user plane device is a centralized address translation device, and the first packet is a service packet that is from the terminal and that is forwarded by a virtual broadband network gateway user plane vBNG-UP device. In this way, addresses of service packets of the terminal can be translated in a centralized manner, and centralized address translation can be implemented, thereby reducing deployment costs.

In another embodiment, the user plane device sends a second packet to the vBNG-CP device, where the second packet includes the address translation information of the terminal, the second packet is used by the vBNG-CP device to save a translation log, and the translation log includes device information of the terminal and the address translation information of the terminal. The user plane device sends the address translation information of the terminal to the vBNG-CP device. In this way, a function of generating the translation log by the vBNG-CP device can be reused, and a log server does not need to be separately disposed, thereby reducing costs.

In another embodiment, the second packet is a session establishment response or a node report request.

According to a second aspect, this application provides an address management method. The method is applied to a virtual broadband gateway vBNG whose user plane and control plane are separated. In the method, a virtual broadband network gateway control plane vBNG-CP device receives a second packet sent by a user plane device, where the second packet includes address translation information of a terminal, the user plane device is provided with a public address pool and/or a port number corresponding to each public address in the public address pool, the address translation information of the terminal includes a private address of the terminal, a public address in the public address pool, and a port number range, the vBNG-CP device is located on the control plane, and the user plane device is located on the user plane; and the vBNG-CP device saves a translation log, where the translation log includes device information of the terminal and the address translation information of the terminal. Because the vBNG-CP device receives the address translation information of the terminal sent by the user plane device, the vBNG-CP device may obtain the translation log including the device information of the terminal and the address translation information of the terminal. In this way, a function of generating the translation log by the vBNG-CP device can be reused, and a log server does not need to be separately disposed, thereby reducing costs.

In an embodiment, the vBNG-CP device receives a node report request sent by the user plane device, where the node report request includes an identifier of the public address pool. The vBNG-CP device sends a node report response to the user plane device, where the node report response includes the public address pool. In this way, the user plane device can apply for the public address pool, and obtain a function of managing the public address pool.

In another embodiment, the vBNG-CP device receives a release request sent by the user plane device, where the release request includes the identifier of the public address pool; and reclaims the public address pool.

According to a third aspect, this application provides an address management apparatus, configured to perform the method in the first aspect or any of the embodiments of the first aspect. Specifically, the apparatus includes units configured to perform the method in the first aspect or any of the embodiments of the first aspect.

According to a fourth aspect, this application provides an address management apparatus, configured to perform the method in the second aspect or any of the embodiments of the second aspect. Specifically, the apparatus includes units configured to perform the method in the second aspect or any of the embodiments of the second aspect.

According to a fifth aspect, this application provides an address management apparatus. The apparatus includes a transceiver, a processor, and a memory. The transceiver, the processor, and the memory may be connected through an internal connection. The memory is configured to store a program, instructions, or code. The processor is configured to execute the program, the instructions, or the code in the memory and cooperate with the transceiver, so that the apparatus completes instructions of the method in the first aspect or any of the embodiments of the first aspect.

According to a sixth aspect, this application provides an address management apparatus. The apparatus includes a transceiver, a processor, and a memory. The transceiver, the processor, and the memory may be connected through an internal connection. The memory is configured to store a program, instructions, or code. The processor is configured to execute the program, the instructions, or the code in the memory and cooperate with the transceiver, so that the apparatus completes instructions of the method in the second aspect or any of the embodiments of the second aspect.

According to a seventh aspect, this application provides a computer program product. The computer program product includes a computer program stored in a computer-readable storage medium, and the computer program is loaded by a processor to implement instructions of the method in the first aspect, the second aspect, any of the embodiments of the first aspect, or any of the embodiments of the second aspect.

According to an eighth aspect, this application provides a computer-readable storage medium configured to store a computer program. The computer program is loaded by a processor to execute instructions of the method in the first aspect, the second aspect, any of the embodiments of the first aspect, or any of the embodiments of the second aspect.

According to a ninth aspect, this application provides an address management system. The system includes the apparatus according to the third aspect and the apparatus according to the fourth aspect, or the system includes the apparatus according to the fifth aspect and the apparatus according to the sixth aspect.

DETAILED DESCRIPTION

The following further describes in detail embodiments of this application with reference to accompanying drawings.

Terms used in embodiments of this application are explained below.

Control plane: configured to perform an operation such as control and/or management on a user plane. A device located on the control plane is configured to perform the operation such as control and/or management on a device located on the user plane.

User plane: configured to transmit a packet of a terminal and/or process the packet of the terminal. The packet may be a packet from the terminal, or may be a packet sent by a backbone network to the terminal. A device located on the user plane includes a vBNG-UP device or a centralized address translation device that is provided in any one of the following embodiments. The device located on the user plane translates an address of the packet of the terminal, and/or forwards the packet of the terminal.

Address translation: replacing a private address of a terminal in an uplink service packet with a public address of the terminal and a port number of a service, where the uplink service packet is a packet sent by the terminal to a backbone network, and the service is a service to which the uplink service packet belongs; or replacing the public address of the terminal in a downlink service packet and the port number of the service with the private address of the terminal.

Address translation information: information for address translation, including a private address of a terminal, a public address of the terminal, and a port number range of the public address, where a port number of a service is a port number in the port number range.

Private address: an address used by a terminal in an access network.

Public address: an address used by a terminal in a backbone network.

Public address pool: including a plurality of consecutive public addresses.

User plane device: a device that is located on a user plane and that has an address translation function, a function of generating address translation information, and a function of managing a public address pool, for example, a vBNG-UP device or a centralized address management device in any one of the following embodiments.

Figure 1:
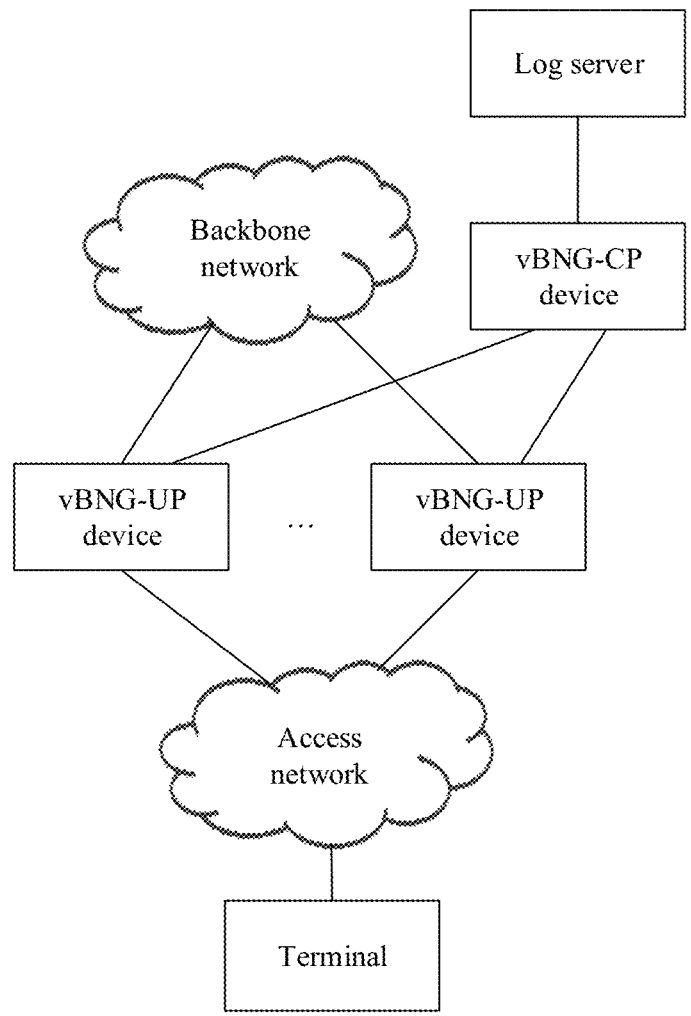
FIG. 1 is a schematic diagram of a network architecture according to an embodiment of this application.

Refer to FIG. 1. An embodiment of this application provides a network architecture. The network architecture is applied to a vBNG whose control plane and user plane are separated, and includes:

a vBNG-CP device and at least one vBNG-UP device, where the vBNG-CP device establishes a network connection to each vBNG-UP device.

The vBNG-CP device is located on the control plane, and each vBNG-UP device is located on the user plane. Each vBNG-UP device is configured to connect an access network and a backbone network. The access network is used by a terminal to access, and the backbone network is an upper-layer network of the access network.

The vBNG-CP device is configured to manage each vBNG-UP device.

The vBNG-UP device is further configured to transmit a service of the terminal. For example, the vBNG-UP device receives a service packet sent by the terminal, and forwards the service packet to the backbone network; or receives a service packet sent by the backbone network, and forwards the service packet to the terminal.

It can be learned from the foregoing content that the service packet is forwarded on the user plane. An address used by the terminal in the backbone network is a public address, and an address used by the terminal in the access network is a private address. The user plane has an address translation function. Therefore, after receiving the service packet, the vBNG-UP device translates, on the user plane, an address of the service packet by using address translation information of the terminal, and then the vBNG-UP device forwards a translated service packet.

The address translation information of the terminal includes the private address of the terminal, a public address corresponding to the private address, and a port number range of the public address. The public address may have a plurality of port number ranges. In this way, the public address and different port number ranges of the public address correspond to private addresses of different terminals, so that one public address can be reused by different terminals.

One public address corresponds to a plurality of ports, port numbers of the plurality of ports may be divided into a plurality of port number ranges, and each port number range includes a plurality of port numbers. For example, a quantity of ports corresponding to one public address may reach 65535. Port numbers of the 65535 ports may be divided into different port number ranges according to an actual requirement. Each port number range may include a plurality of consecutive port numbers, and a quantity of port numbers included in each port number range may be equal or unequal.

In this way, a process of forwarding a service packet on a user plane may be as follows:

When a terminal sends a service packet to a backbone network, for ease of description, the service packet is referred to as a first service packet, and a source address included in the first service packet is a private address of the terminal. On the user plane, the private address in the first service packet is replaced with a public address corresponding to the private address and a port number in a port number range, to obtain a second service packet, and then the second service packet is forwarded to the backbone network. The port number corresponds to a service to which the first service packet belongs, that is, different port numbers in the port number range are in a one-to-one correspondence to different services of the terminal.

Similarly, when the backbone network sends a service packet to the terminal, for ease of description, the service packet is referred to as a third service packet, a destination address included in the third service packet is a public address of the terminal, and a destination port number is a port number in the port number range. On the user plane, the public address in the third service packet is replaced with a private address that corresponds to the public address and the port number range, to obtain a fourth service packet, and then the fourth service packet is forwarded to the terminal.

To implement the address translation function on the user plane, embodiments of this application provide two address translation manners: the first one is a distributed address translation manner, and the second one is a centralized address translation manner.

In the distributed address translation manner, the address translation function is distributed on each vBNG-UP device, that is, each vBNG-UP device has the address translation function. In this way, when receiving a service packet, each vBNG-UP device first translates an address of the service packet by using address translation information of a terminal, and then forwards a translated service packet.

Figure 2:
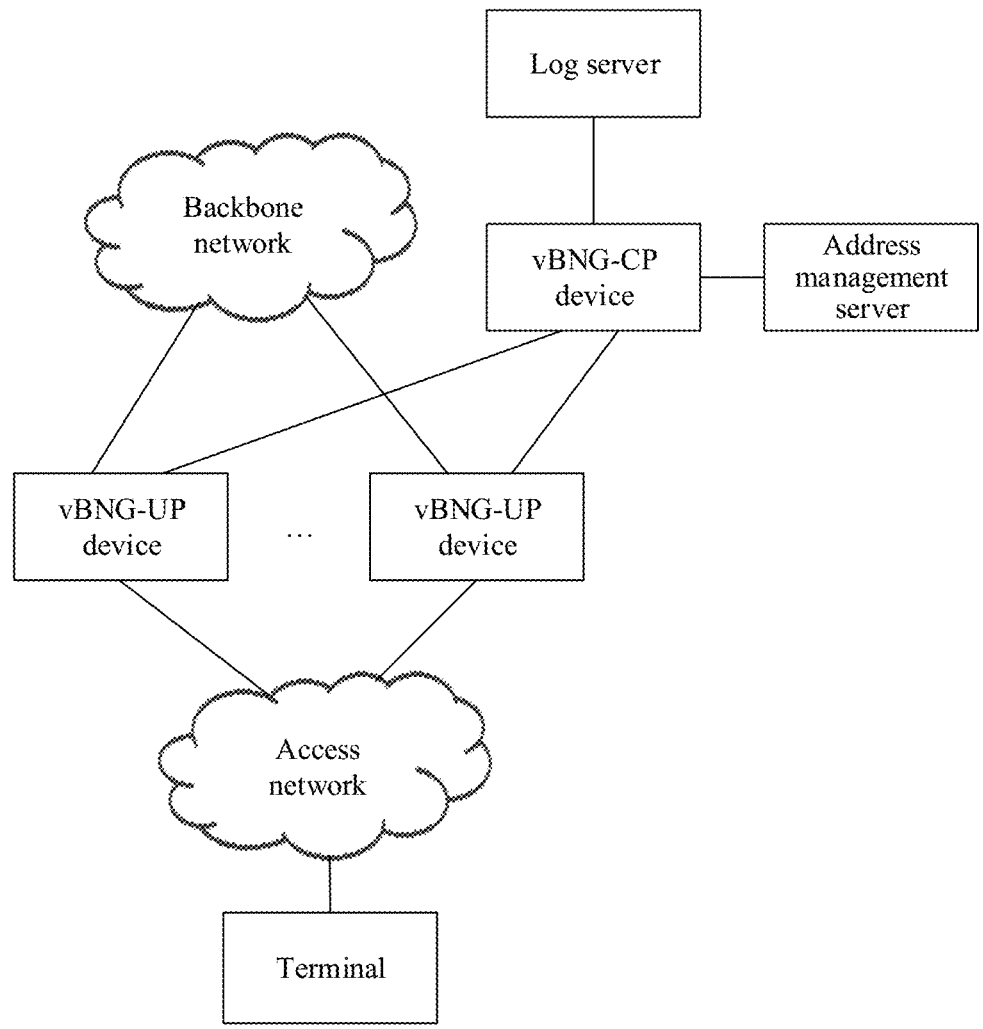
FIG. 2 is a schematic diagram of another network architecture according to an embodiment of this application.

Refer to FIG. 2. For the distributed address translation manner, a network architecture further includes an address management server, where the address management server is provided with a plurality of public address pools, and each public address pool includes at least one public address. A network connection is established between the address management server and a vBNG-CP device.

For each vBNG-UP device, the vBNG-UP device may apply for a public address pool from the address management server by using the vBNG-CP device. In this way, when a terminal is connected to a backbone network by using the vBNG-UP device, the vBNG-UP device may be further configured to generate address translation information of the terminal, where a public address included in the address translation information of the terminal is an address in the public address pool.

In the network architecture shown in FIG. 2, the vBNG-CP device and the address management server are two different devices. Alternatively, in the network architecture shown in FIG. 1, the vBNG-CP device and the address management server are integrated, that is, the vBNG-CP device is provided with a plurality of public address pools.

Figure 3:
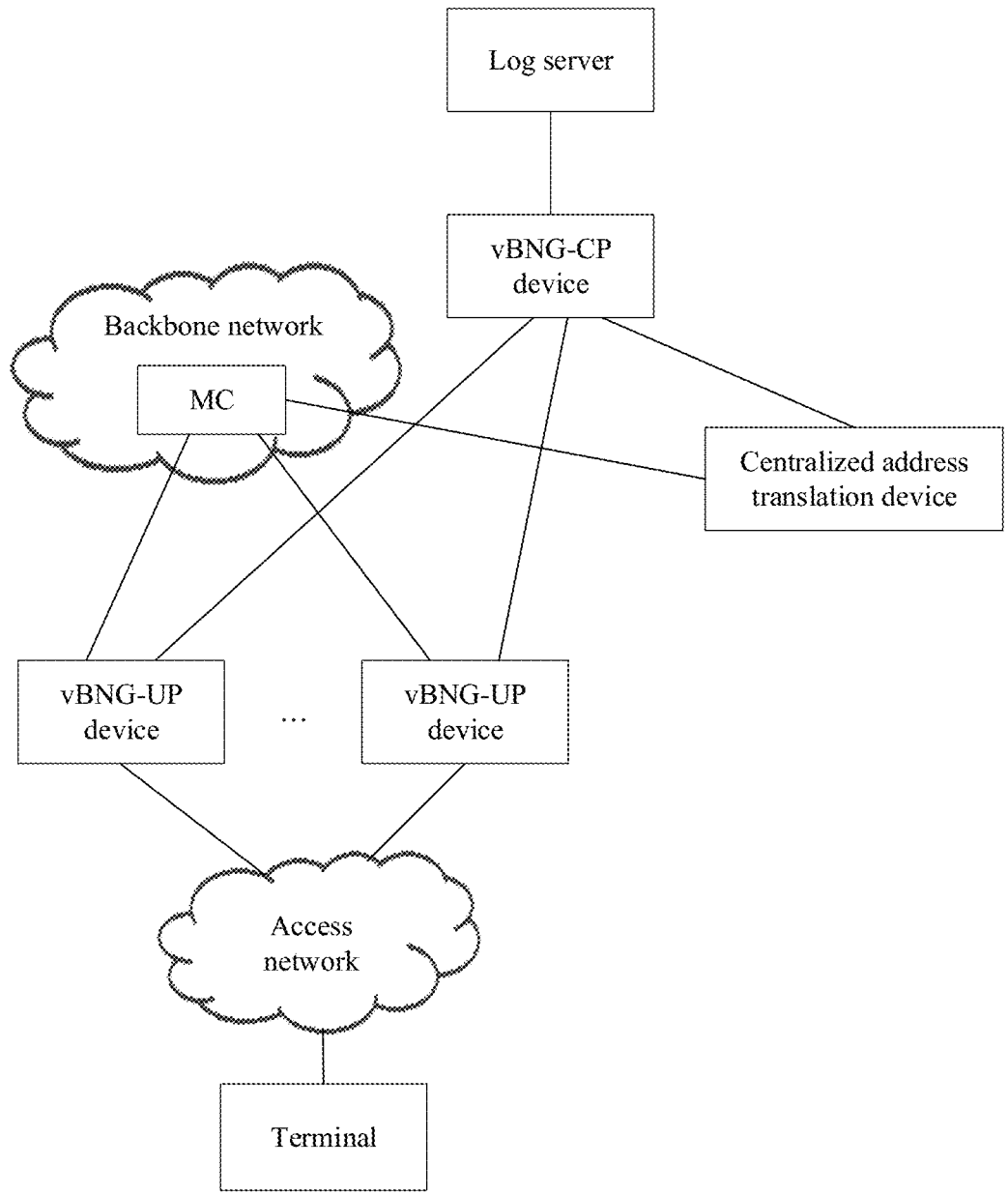
FIG. 3 is a schematic diagram of another network architecture according to an embodiment of this application.

In the centralized address translation manner, refer to FIG. 3. A metro center (MC) and a centralized address translation device are added on a basis of the network architecture shown in FIG. 1, the MC is located on a backbone network, and the centralized address translation device is located on a user plane and has an address translation function. The centralized address translation device is provided with a plurality of public address pools.

In this way, when receiving a service packet from a terminal, each vBNG-UP device sends the service packet to the MC. The MC then sends the service packet to the centralized address translation device. The centralized address translation device performs the address translation function on the service packet by using address translation information of the terminal, and then sends a translated service packet to the MC. The MC receives and forwards the translated service packet.

When receiving a service packet that needs to be sent by the backbone network to the terminal, the MC sends the service packet to the centralized address translation device. The centralized address translation device performs the address translation function on the service packet by using address translation information of the terminal, and then sends a translated service packet to the MC. The MC forwards the translated service packet to the vBNG-UP device. The vBNG-UP device then sends the translated service packet to the terminal.

A public address in the address translation information of the terminal is an address in a public address pool in the centralized address translation device.

Refer to each network architecture shown in FIG. 1 to FIG. 3. The network architecture may further include a log server, and the log server establishes a network connection to the vBNG-CP device.

The log server is configured to save a translation log, where the translation log includes device information of the terminal, a private address of the terminal, and a public address and a port number range that correspond to the private address.

In an embodiment, the foregoing translation log is a remote authentication dial in user service (RADIUS) log, the foregoing address management server is a dynamic address pool (ODAP) server, the foregoing centralized address translation device is for carrier grade network (CGN) address translation, the foregoing log server is a RADIUS server, and the foregoing public address pool is a CGN public address pool.

Figure 4:
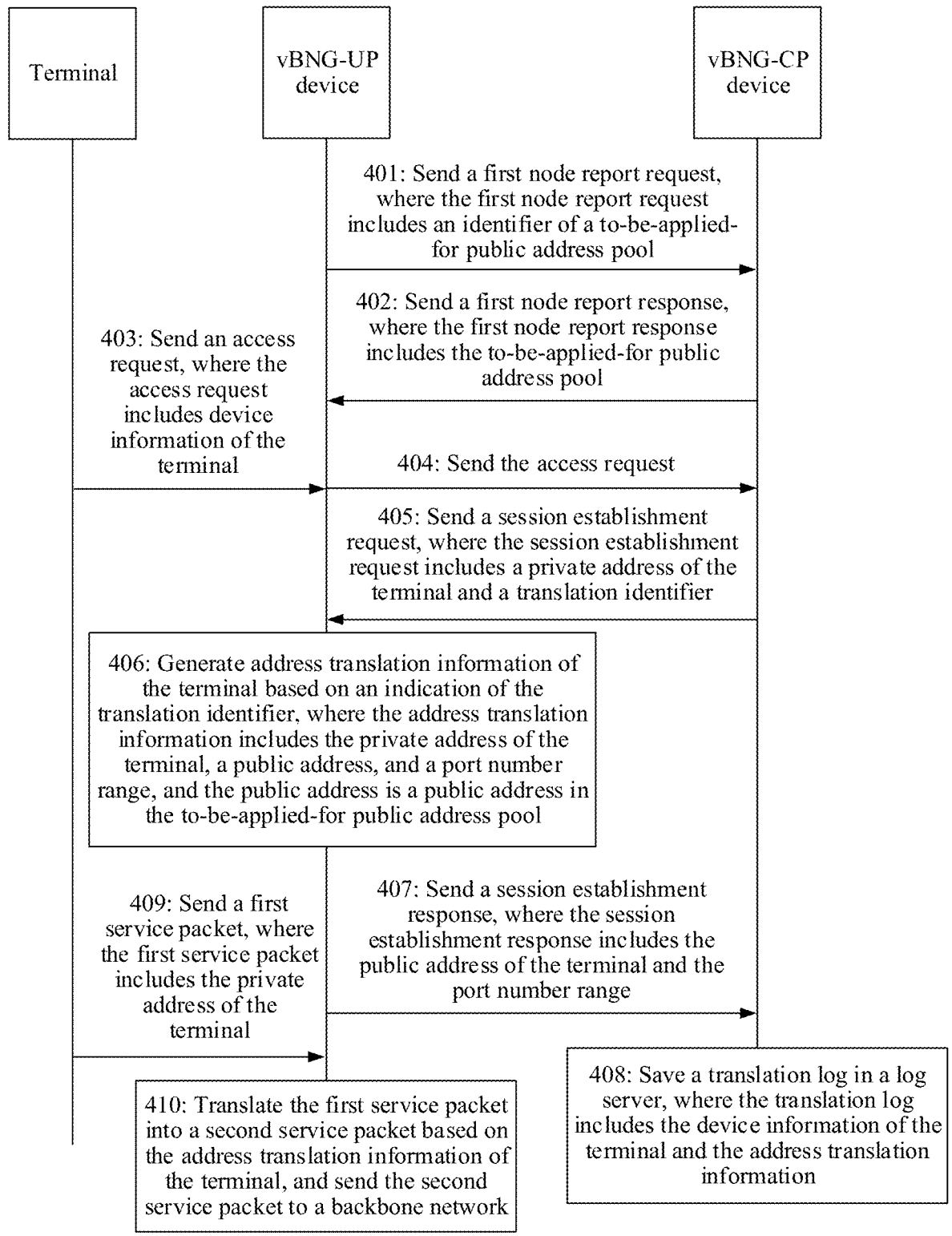
FIG. 4 is a flowchart of an address management method according to an embodiment of this application.

Refer to FIG. 4. An embodiment of this application provides an address management method. The method is applied to a network architecture of distributed address translation, that is, applied to the network architecture shown in FIG. 1 or FIG. 2. The method includes the following operations.

Operation 401: A vBNG-UP device sends a first node report request to a vBNG-CP device, where the first node report request includes an identifier of a to-be-applied-for public address pool.

The vBNG-UP device is any vBNG-UP device in the network architecture. For each vBNG-UP device in the network architecture, the vBNG-CP device and the vBNG-UP device may agree on an identifier of each public address pool in advance. Therefore, the vBNG-UP device includes the identifier of the to-be-applied-for public address pool.

An operation of which the vBNG-CP device and the vBNG-UP device agree the identifier of each public address pool may be as follows:

The vBNG-CP device allocates different identifiers to different public address pools, and sends identifiers of different public address pools to each vBNG-UP device in the network architecture. In this way, each vBNG-UP device may apply for a public address pool corresponding to each identifier sent to the vBNG-UP device, to avoid a conflict caused by different vBNG-UP devices applying for a same public address pool.

When the vBNG-CP device and an address management server are integrated, the vBNG-CP device is provided with a plurality of public address pools, to directly allocate an identifier to each public address pool in the plurality of public address pools.

When the vBNG-CP device and the address management server are different devices, the address management server is provided with a plurality of public address pools, and the vBNG-CP device negotiates with the address management server to allocate an identifier of each public address pool in the plurality of public address pools.

In operation 401, the first node report request includes an address pool allocate request field, and the address pool allocate request field includes the identifier of the to-be-applied-for public address pool.

The first node report request may be a message obtained by extending a field on a basis of a node report request defined in a packet forwarding control protocol (PFCP) protocol, where the extended field is the address pool allocate request field.

Refer to Table 1. The node report request defined in the PFCP protocol includes a plurality of fields (which may also be referred to as information elements), where the plurality of fields are a node identifier (ID), a node report type, a user plane path failure report, a user plane path recovery report, a clock drift report, and a general packet radio service tunneling protocol-user plane quality of service report (GTP-U Path QoS Report).

In operation 401, the address pool allocate request field is added to the node report request to form the first node report request shown in Table 1. In the following Table 1, P represents whether a field is an optional field, M represents a mandatory field, and C represents an optional field. For example, as shown in the following Table 1, the PFCP protocol defines the node identifier as a mandatory field, and the user plane path failure report as an optional field.

TABLE 1

| Information elements (information elements, IE) | P | Condition/Comment(Condition/Comment) | IE type (IE Type) |
|---|---|---|---|
| Node identifier (Node ID) | M | This IE shall contain the unique identifier of the sending Node. | Node ID |
| Node report type (Node Report Type) | M | This IE shall indicate the type of the report. | Node Report Type |
| User plane path failure report (User Plane Path Failure Report) | C | This IE shall be present if the Node Report Type indicates a User Plane Path Failure Report. | User Plane Path Failure Report |
| User plane path recovery report (User Plane Path Recovery Report) | C | This IE shall be present if the Node Report Type indicates a User Plane Path Recovery Report. | User Plane Path Recovery Report |
| Clock drift report (Clock Drift Report) | C | This IE shall be present if the Node Report Type indicates a Clock Drift Report. More than one IE with this type may be included to send Clock Drift Reports for different TSN Time Domain Numbers. | Clock Drift Report |
| General packet radio service tunneling protocol-user plane quality of service report (GPT-U Path QoS Report) | C | This IE shall be present if the Node Report Type indicates a GTP-U Path QoS Report. More than one IE with this type may be included to represent multiple remote GTP-U peers for which QoS information is reported. | GPT-U Path QoS Report |
| Address pool allocate request field | C | This IE shall be present if the Node Report Type indicates CGN Address Allocate Request. | Address pool allocate request |

For the foregoing node report type, refer to the following Table 2. The node report type may include a plurality of sub-fields such as a field type, a field length, a flag field, and an extensible field. The field type carries a type of a node report type field, and the field length carries a length of the node report type field, where the length is n, and n is an integer greater than 1. The flag field includes eight flag bits. type, where each flag bit in the eight flag bits included in the flag field may include one bit; and the extensible field occupies a sixth octet to an $n^{th}$ octet of the node report type.

In an embodiment, a value of the CAAR is set to a value 1 or 0, and the value 1 or 0 represents that the CAAR indicates that the field extended in the first node report request is the address pool allocate request field.

TABLE 2

| Octet | 8 | 7 | 6 | 5 | 4 | 3 | 2 | 1 |
|---|---|---|---|---|---|---|---|---|
| Field type (1 to 2) | | | | Type = 101 (decimal) | | | | |
| Field length (3 to 4) | | | | Length = n | | | | |
| Flag field (5) | Spare | CUI | CARR | CAAR | GPQR | CKDR | UPRR | UPFR |
| Extensible field (6 to n) | | | These octet(s) is/are present only if explicitly specified | | | | | |

The eight flag bits are respectively spare, CGN user information (CUI), a CGN address allocate request (CAAR), a CGN address release request (CARR), a GTP-U path QoS report (GPQR), a clock drift report (CKDR), a user plane path recovery report (UPRR), and a user plane path failure report (UPFR).

For the flag bits CUI, CARR, and CAAR, the three flag bits respectively indicate which field is extended in the node report request. The CAAR indicates that the field extended in the first node report request is the address pool allocate request field. Fields indicated by the other two flag bits are described in detail in subsequent content.

Each sub-field in the node report type includes one or more octets. For example, refer to the following Table 2. The field type includes two octets, that is, occupies a first octet and a second octet of the node report type; the field length includes two octets, that is, occupies a third octet and a fourth octet of the node report type; the flag field includes one octet, that is, occupies a fifth octet of the node report For the foregoing address pool allocate request field, refer to the following Table 3. The address pool allocate request field may include a plurality of sub-fields such as a field type, a field length, and an address pool identifier field. The field type carries a type of the address pool allocate request field, the field length carries a length of the address pool allocate request field, and the address pool identifier field carries the identifier of the to-be-applied-for public address pool.

Each sub-field in the address pool allocate request field includes one or more octets. For example, refer to the following Table 3. The field type includes two octets, that is, occupies a first octet and a second octet of the address pool allocate request field; the field length includes two octets, that is, occupies a third octet and a fourth octet of the address pool allocate request field; and the address pool identifier field occupies a fifth octet to an $n^{th}$ octet of the address pool allocate request field.

TABLE 3

Field type (1 to 2) Type of the field allocate request field = NN (decimal)
Field length (3 to 4) Length = n

| IE name | P | Condition/Comment | IE type |
|---|---|---|---|
| Address pool identifier field (5 to n) | M | CGN Public Address Pool Identity that to be allocated by vBNG-CP | Identifier of the to-be-applied-for public address pool |

For the foregoing address pool identifier field, refer to the following Table 4. The address pool identifier field may include a plurality of sub-fields such as a field type, a field length, an identifier length, an identifier field, and an extensible field. The field type carries a type of the address pool identifier field, the field length carries a length of the address pool identifier field, the identifier length carries an identifier length of the to-be-applied-for public address pool, and the identifier field carries the identifier of the to-be-applied-for public address pool.

Each sub-field in the address pool identifier field includes one or more octets. For example, refer to the following Table 4. The field type includes two octets, that is, occupies a first octet and a second octet of the address pool identifier field; the field length includes two octets, that is, occupies a third octet and a fourth octet of the address pool identifier field; the identifier length includes two octets, that is, occupies a fifth octet and a sixth octet of the address pool identifier field; the identifier field occupies a seventh octet to a $k^{th}$ octet of the address pool identifier field, where k is an integer greater than 7 and less than n; and the extensible field occupies the $k^{th}$ octet to an $n^{th}$ octet of the address pool identifier field.

TABLE 4

| Octet | 8 | 7 | 6 | 5 | 4 | 3 | 2 | 1 |
|---|---|---|---|---|---|---|---|---|
| Field type (1 to 2) | Type = NN (decimal) | | | | | | | |
| Field length (3 to 4) | Length = n | | | | | | | |
| Identifier length (5 to 6) | CGN Public Address Pool Id Length | | | | | | | |
| Identifier field (7 to k) | CGN Public Address Pool Identity | | | | | | | |
| Extensible field (k to n) | These octet(s) is/are present only if explicitly specified. | | | | | | | |

Operation 402: The vBNG-CP device receives the first node report request, and sends a first node report response to the vBNG-UP device, where the first node report response includes the to-be-applied-for public address pool.

In an embodiment, the first node report response includes a start public address and an address capacity of the to-be-applied-for public address pool, so that the first node report response includes the to-be-applied-for public address pool. The address capacity is equal to a quantity of public addresses included in the public address pool.

In operation 402, when the vBNG-CP device and the address management server are integrated, the vBNG-CP device receives the first node report request, obtains the to-be-applied-for public address pool based on the identifier of the to-be-applied-for public address pool included in the first node report request, and sends the first node report response to the vBNG-UP device, where the first node report response includes the to-be-applied-for public address pool.

When the vBNG-CP device and the address management server are two different devices, the vBNG-CP device receives the first node report request, and sends an address allocate request (also referred to as allocate address request) to the address management server, where the address allocate request includes the identifier of the to-be-applied-for public address pool. The address management server receives the address allocate request, obtains the to-be-applied-for public address pool based on the identifier of the to-be-applied-for public address pool included in the address allocate request, and sends an address allocate response to the vBNG-CP device, where the address allocate response includes the to-be-applied-for public address pool. The vBNG-CP device receives the address allocate response, and sends the first node report response to the vBNG-UP device, where the first node report response includes the to-be-applied-for public address pool.

The first node report response includes an address pool information field, and the address pool information field includes the to-be-applied-for public address pool.

The first node report response may be a message obtained by extending a field on a basis of a node report response defined in the PFCP protocol, where the extended field is the address pool information field, and the address pool information field includes the to-be-applied-for public address pool.

Refer to the following Table 5. The node report response defined in the PFCP protocol includes a Node ID, a cause, and an offending IE field. The address pool information field is added to the node report response to form the first node report response shown in Table 2.

TABLE 5

| IE | P | Condition/Comment | IE type |
|---|---|---|---|
| Node identifier (Node ID) | M | This IE shall contain the unique identifier of the sending Node. | Node ID |
| Cause (Cause) | M | This IE shall indicate the acceptance or the rejection of the corresponding request message. | Cause |
| Offending IE (Offending IE) | C | This IE shall be included if the rejection cause is due to a conditional or mandatory IE missing or faulty. | Offending IE |
| Address pool information field | C | This IE shall be included if Node Report Request indicate CAAR. | Address pool information |

For the foregoing address pool information field, refer to the following Table 6. The address pool information field may include a plurality of sub-fields such as a field type, a field length, a public address pool field, and an address pool identifier field. The field type carries a type of the address pool information field, the field length carries a length of the address pool information field, the public address pool field carries a start address and an address range of the to-be-applied-for public address pool, the address range may be a quantity of public addresses included in the to-be-applied-for public address pool, and the address pool identifier field carries the identifier of the to-be-applied-for public address pool.

TABLE 6

Field type (1 to 2) Type of the field allocate request field = NN (decimal)
Field length (3 to 4) Length = n

| IE name | P | Condition/Comment | IE type |
|---|---|---|---|
| Public address pool field | M | CGN Public Address and mask | To-be-applied-for public address pool |
| Address pool identifier | M | CGN Address Pool Identity that to be | Identifier of the to-be-applied-for |

TABLE 6-continued

Field type (1 to 2) Type of the field allocate request field = NN (decimal)
Field length (3 to 4) Length = n

| IE name | P | Condition/Comment | IE type |
|---------|---|-------------------|---------|
| field |   | allocated by DBNG-CP. | public address pool |

After the vBNG-UP device applies for the public address pool, when a terminal requests to be connected to a backbone network, the vBNG-UP device may generate address translation information for the terminal according to the following operations. The address translation information is for performing address translation on a service packet, and the service packet is a packet from the terminal or a packet to be sent to the terminal.

Operation 403: The terminal sends an access request to the vBNG-UP device, where the access request includes device information of the terminal.

The device information includes information such as a device identifier and a device type of the terminal. The device identifier of the terminal may be a user account corresponding to the terminal.

In an embodiment, the access request is a dynamic host configuration protocol (DHCP) request.

Operation 404: The vBNG-UP device receives the access request sent by the terminal, and sends the access request to the vBNG-CP device.

Operation 405: The vBNG-CP device receives the access request, and sends a session establishment request to the vBNG-UP device, where the session establishment request includes a private address of the terminal and a translation identifier, and the translation identifier indicates that the address translation information is generated for the terminal.

In operation 405, the vBNG-CP device receives the access request, where the access request includes the device information of the terminal, and the device information includes the device identifier and the device type of the terminal; allocates the private address to the terminal; determines, based on the device type of the terminal, whether address translation needs to be performed on the terminal; and sends, if determining that address translation needs to be performed, the session establishment request to the vBNG-UP device, where the session establishment request includes the private address of the terminal and the translation identifier.

The vBNG-CP device saves a type of a device on which address translation needs to be performed, and the vBNG-CP device may determine, by determining whether the device type of the terminal is the type of the device on which address translation needs to be performed, whether address translation needs to be performed on the terminal.

Operation 406: The vBNG-UP device receives the session establishment request, and generates the address translation information of the terminal based on an indication of the translation identifier included in the session establishment request, where the address translation information includes the private address of the terminal, a public address, and a port number range, and the public address is a public address in the to-be-applied-for public address pool.

In operation 406, the vBNG-UP device receives the session establishment request, where the session establishment request includes the private address of the terminal and the translation identifier; selects, based on the indication of the translation identifier, a spare public address from the to-be-applied-for public address pool; and selects a plurality of consecutive ports from spare ports corresponding to the public address, to obtain the address translation information of the terminal, where the address translation information includes the private address, the public address, and the port number range, and the port number range includes a port number of each port in the plurality of ports.

After receiving the session establishment request, the vBNG-UP device further establishes a network connection between the terminal and the backbone network, and sends the private address to the terminal, so that the terminal can send the service packet by using the private address. In addition, after establishing the network connection, the vBNG-UP device performs an operation of the following operation 407.

Operation 407: The vBNG-UP device sends a session establishment response to the vBNG-CP device, where the session establishment response includes the public address of the terminal and the port number range.

The session establishment response includes an address translation information field, and the address translation information field includes the address translation information of the terminal.

In operation 407, an address translation information field is extended in the session establishment response defined in the PFCP protocol, and the address translation information field includes the address translation information of the terminal.

Refer to the following Table 7. The session establishment response includes a node identifier, a cause, an offending IE, a user plane session identifier (UP F-SEID), a created packet detection rule (PDR), load control information, overload control information, a serving gateway connection identifier (SGW-U FQ-CSID), a public data gateway connection identifier (PGW-U FQ-CSID), a failed rule identifier (ID), a created traffic endpoint identifier (Created Traffic Endpoint), created bridge information (Created Bridge Info for TSC), ATSSS control parameters, and the address translation information field.

TABLE 7

| IE | P | Condition/Comment | IE type |
|----|---|-------------------|---------|
| Node identifier (Node ID) | M | This IE shall contain the unique identifier of the sending Node. | Node ID |
| Cause (Cause) | M | This IE shall indicate the acceptance or the rejection of the corresponding request message. | Cause |
| Offending IE (Offending IE) | C | This IE shall be included if the rejection is due to a conditional or mandatory IE missing or faulty. | Offending IE |
| User plane session identifier (UP F-SEID) | C | This IE shall be present if the cause is set to "Request accepted (success)". When present, it shall contain the unique identifier allocated by the UP function identifying the session. | F-SEID |

TABLE 7-continued

| IE | P | Condition/Comment | IE type |
| --- | --- | --- | --- |
| Created packet detection rule (Created PDR) | C | This IE shall be present if the cause is set to "success" and the UP function was requested to allocate a local F-TEID or a UE IP address/prefix for the PDR. When present, this IE shall contain the PDR information associated to the PFCP session. There may be several instances of this IE. | Created PDR |
| Load control information (Load Control Information) | O | The UP function may include this IE if it supports the load control feature and the feature is activated in the network. | Load Control Information |
| Overload control information (Overload Control Information) | O | During an overload condition, the UP function may include this IE if it supports the overload control feature and the feature is activated in the network. | Overload Control Information |
| Serving gateway connection identifier (SGW-U FQ-CSID) | C | This IE shall be included according to the requirements in clause 23 of 3GPP TS 23.007 [24]. | FQ-CSID |
| Public data gateway connection identifier (PGW-U FQ-CSID) | C | This IE shall be included according to the requirements in clause 23 of 3GPP TS 23.007 [24]. | FQ-CSID |
| Failure rule identifier (Failed Rule ID) | C | This IE shall be included if the Cause IE indicates a rejection due to a rule creation or modification failure. | Failed Rule ID |
| Created traffic endpoint identifier (Created Traffic Endpoint) | C | This IE shall be present if the cause is set to "success" and the UP function was requested to allocate a local F-TEID or a UE IP address/prefix in a Created Traffic Endpoint IE. When present, it shall contain the local F-TEID or UE IP address/prefix to be used for this Traffic Endpoint. | Created Traffic Endpoint |
| Created bridge information (Created Bridge Info for TSC) | C | This IE shall be present if the UPF was requested to provide Bridge information for TSC in the PFCP Session Establishment Request. When present, it shall contain the Bridge information for TSC for the PFCP session. | Created Bridge Info for TSC |
| ATSSS control parameters (ATSSS Control Parameters) | C | This IE shall be present if ATSSS functionality is required in the request message and the UPF allocates the resources and parameters corresponding to the required ATSSS functionality. | ATSSS Control Parameters |
| Address translation information | C | This IE represents one piece of address translation information | Address translation information |

Operation 408: The vBNG-CP device receives the session establishment response, and saves a translation log in a log server, where the translation log includes the device information of the terminal and the address translation information.

In this operation, the vBNG-CP device receives the session establishment response, where the session establishment response includes the address translation information of the terminal; and sends the translation log to the log server, where the translation log includes the device information of the terminal and the address translation information. The log server receives and saves the translation log.

The translation log may be a Radius log.

The vBNG-CP device generates the translation log. In this way, a function of generating the translation log by the vBNG-CP device is reused, and the log server does not need to be separately deployed, thereby reducing costs.

After the vBNG-UP device establishes the network connection between the terminal and the backbone network, the terminal may transmit a service to the backbone network. A transmission process may be as follows:

Operation 409: The terminal sends a first service packet to the vBNG-UP device, where the first service packet includes the private address of the terminal.

In operation 409, the terminal sends the first service packet to the vBNG-UP device, where a source address of the first service packet is the private address of the terminal, and the first service packet belongs to a service that needs to be transmitted by the terminal.

Operation 410: The vBNG-UP device receives the first service packet, translates the first service packet into a second service packet based on the address translation information of the terminal, and sends the second service packet to the backbone network, where the second service packet includes the public address of the terminal, a port number in the port number range, and a part of the first service packet except the private address of the terminal.

In operation 410, the vBNG-UP device receives the first service packet; obtains the address translation information of the terminal if the first service packet is a start packet belonging to the service, where the address translation information includes the private address of the terminal, the public address, and the port number range; selects, from the port number range, a spare port number for the service; replaces the private address included in the first service packet with the public address of the terminal and the port number of the service, to obtain the second service packet; and sends the second service packet to the backbone network. Then, each time the vBNG-UP device receives a service packet that belongs to the service and that is sent by the terminal, the vBNG-UP device obtains the public address of the terminal and the port number of the service, replaces the private address in the service packet with the public address of the terminal and the port number of the service, and sends a translated service packet to the backbone network.

Similarly, the vBNG-UP device further receives a third service packet that belongs to the service and that is sent by the backbone network, where a destination address of the third service packet is the public address of the terminal, and a destination port number is the port number of the service; obtains the private address of the terminal based on the public address of the terminal and the port number of the service; replaces the public address of the terminal and the port number of the service in the third service packet with the private address of the terminal, to obtain a fourth service packet; and sends the fourth service packet to the terminal.

After selecting the port number for the service, the vBNG-UP device may save, in an address translation mapping relationship, a correspondence among the private address of the terminal, a service type of the service, the public address of the terminal, and the port number of the service.

Therefore, an operation of which the vBNG-UP device determines whether a service packet sent by the terminal is a start packet belonging to a service or obtains the public address of the terminal and a port number of the service may be as follows:

The vBNG-UP device receives the service packet sent by the terminal, where the service packet includes the private address of the terminal and a service type of the service; queries the address translation mapping relationship based on the private address of the terminal and the service type of the service; determines, if no corresponding public address and port number are found, that the service packet is the start packet belonging to the service; and obtains, if the corresponding public address and port number are found, the public address of the terminal and the port number of the service.

An operation of which the vBNG-UP device obtains the private address of the terminal may be that: the vBNG-UP device receives a service packet sent by the backbone network, where the service packet includes the public address of the terminal and the port number of the service; and queries, based on the public address of the terminal and the port number of the service, the private address of the terminal from the address translation mapping relationship.

In an embodiment, the vBNG-UP device may release the public address pool applied for by the vBNG-UP device, or when all public addresses in the public address pool applied for by the vBNG-UP device are spare, the vBNG-UP device may release the public address pool. During implementation:

the vBNG-UP device sends a second node report request to the vBNG-CP device, where the second node report request includes an identifier of a to-be-released public address pool; and the vBNG-CP device receives the second node report request, reclaims the to-be-released public address pool based on the identifier of the to-be-released public address, and sends a second node report response to the vBNG-UP device.

In an embodiment, the second node report request includes an address pool release request field, and the address pool release request field includes the identifier of the to-be-released public address pool.

In an embodiment, the address pool release request field further includes the to-be-released public address pool.

In an embodiment, the second node report request may be a message obtained by extending a field on a basis of a node report request defined in the PFCP protocol, where the extended field is the address pool release request field.

The second node report request includes a node report type. The node report type may be shown in Table 2. The node report type includes a flag bit CARR, and the CARR indicates that the extended field in the second node report request is the address pool release request field.

In an embodiment, a value of the CARR may be set to a value 1 or 0, and the value 1 or 0 represents that the CARR indicates that the field extended in the second node report request is the address pool release request field.

For the foregoing address pool release request field, refer to the following Table 8. The address pool release request field may include a plurality of sub-fields such as a field type, a field length, a public address pool field, and an address pool identifier field. The field type carries a type of the address pool release request field, the field length carries a length of the address pool release request field, the public address pool carries the to-be-released public address pool, and the address pool identifier field carries the identifier of the to-be-released public address pool.

TABLE 8

Field type (1 to 2) Type of the field allocate request field = NN (decimal)
Field length (3 to 4) Length = n

| IE name | P | Condition/Comment | IE type |
| --- | --- | --- | --- |
| Public address pool | M | CGN Public Address and mask | To-be-released public address pool |
| Address pool identifier field | M | CGN Address Pool Identity that to be allocated by DBNG-CP. | Identifier of the to-be-released public address pool |

In this embodiment of this application, a vBNG-UP device applies for a public address pool from a vBNG-CP device. Then, when address translation information needs to be generated for a terminal, the vBNG-UP device receives a session establishment request sent by the vBNG-CP device, where the session establishment request includes a private address of the terminal; and selects, from the public address pool, a public address for the terminal, and obtains a port number range corresponding to the public address, to obtain the address translation information of the terminal, where the address translation information includes the private address of the terminal, the public address, and the port number range. After obtaining the address translation information of the terminal, the vBNG-UP device receives a service packet, translates an address of the service packet by using the address translation information of the terminal, and then forwards a translated service packet. The vBNG-UP device applies for the public address pool, to include the public address pool and/or a port number corresponding to each public address in the public address pool. In this way, the vBNG-UP device has a function of managing the public address pool and/or the port number, a function of generating the address translation information, and an address translation function, that is, the three functions are integrated into one vBNG-UP device for execution. In this way, the vBNG-UP device does not need to exchange a large quantity of standardized interface messages with the vBNG-CP device, so that a large quantity of network resources are saved. In addition, because the three functions are integrated into the vBNG-UP device, the vBNG-UP device generates the address translation information of the terminal by using a new method, and a new manner of obtaining the address translation information is provided; and the vBNG-UP device translates the address of the service packet, thereby implementing a distributed address translation function.

Figure 5A:
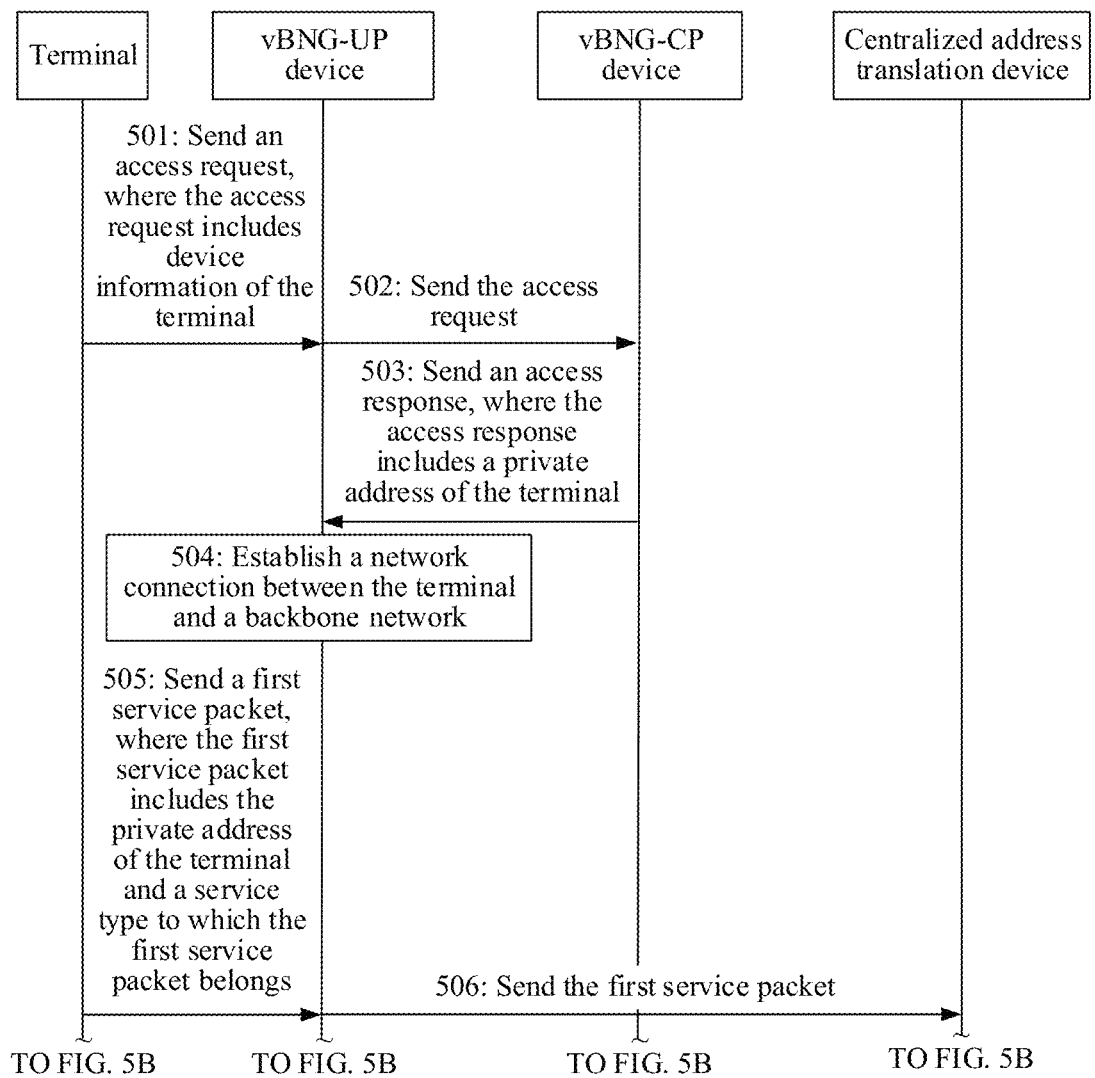
FIG. 5A and FIG. 5B are a flowchart of another address management method according to an embodiment of this application.
Figure 5B:
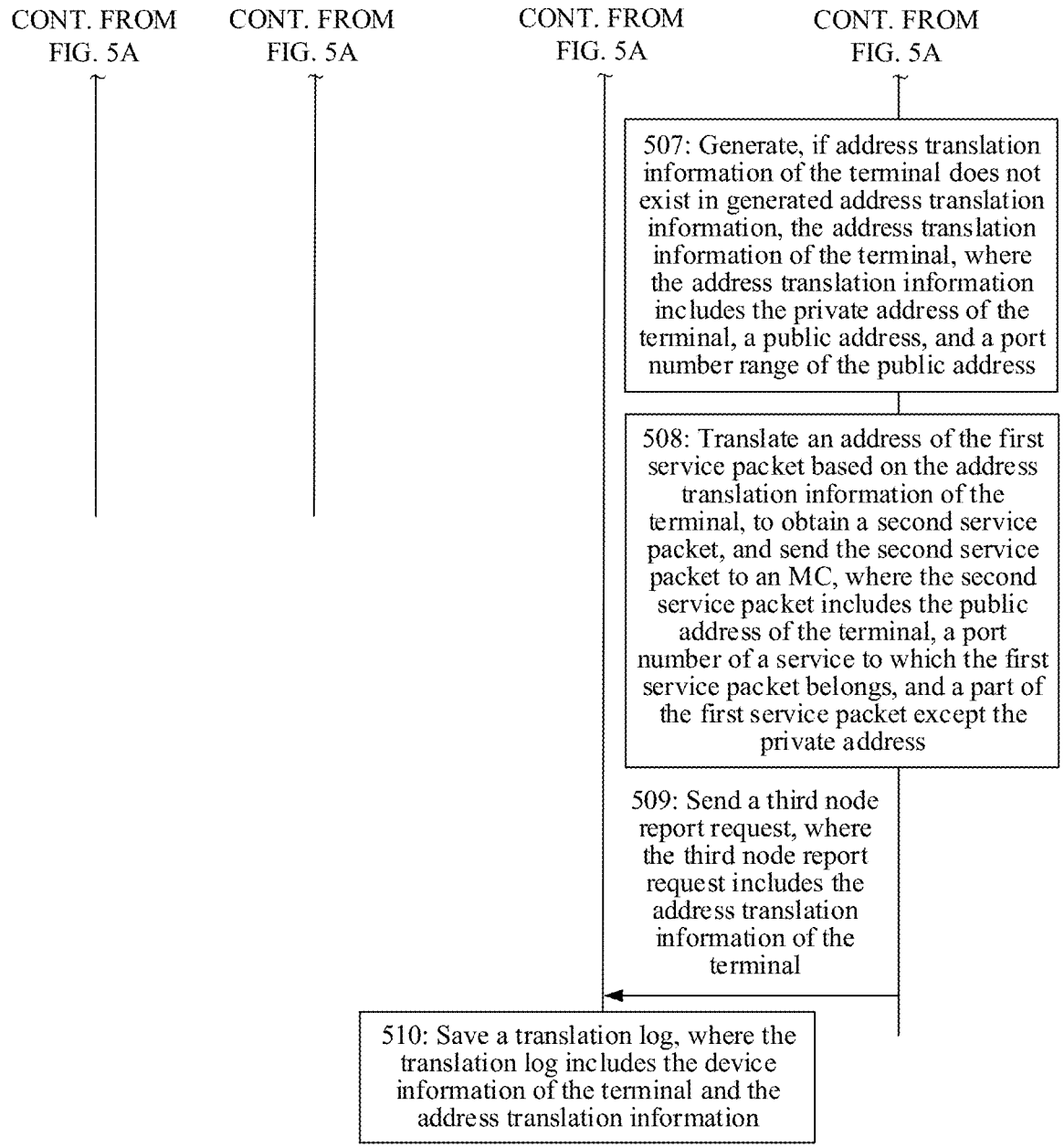

Refer to FIG. 5A and FIG. 5B. An embodiment of this application provides an address management method. The method is applied to a network architecture of centralized address translation, that is, applied to the network architecture shown in FIG. 3. The method includes the following operations.

Operation 501: A terminal sends an access request to a vBNG-UP device, where the access request includes device information of the terminal.

The device information includes information such as a device identifier and a device type of the terminal.

The access request may be a DHCP Request.

Operation 502: The vBNG-UP device receives the access request, and sends the access request to a vBNG-CP device.

Operation 503: The vBNG-CP device receives the access request, and sends an access response to the vBNG-UP device, where the access response includes a private address of the terminal.

In operation 503, the vBNG-CP device receives the access request, where the access request includes the device information of the terminal, and the device information includes the device identifier and the device type of the terminal; determines, based on the device type of the terminal device, whether address translation needs to be performed on the terminal; and allocates, if determining that address translation needs to be performed, a private address for address translation to the terminal, and sends the access response to the vBNG-CP device, where the access response includes the private address of the terminal.

The vBNG-CP device saves a type of a device on which address translation needs to be performed, and the vBNG-CP device may determine, by determining whether the device type of the terminal is the type of the device on which address translation needs to be performed, whether address translation needs to be performed on the terminal.

The vBNG-CP device includes a range of private addresses on which address translation needs to be performed and a range of private addresses on which address translation does not need to be performed. If it is determined that address translation needs to be performed, a private address is selected for the terminal from the range of private addresses on which address translation needs to be performed. If it is determined that address translation does not need to be performed, a private address is selected for the terminal from the range of private addresses on which address translation does not need to be performed.

In operation 503, the vBNG-CP device further correspondingly saves the private address of the terminal and the device information of the terminal in a correspondence between the private address and the device information.

In an embodiment, the access response may be a DHCP ACK.

Operation 504: The vBNG-UP device receives the access response, and establishes a network connection between the terminal and a backbone network.

In a process of establishing the network connection between the terminal and the backbone network, the vBNG-UP device further sends the private address of the terminal to the terminal.

After the vBNG-UP device establishes the network connection between the terminal and the backbone network, the terminal may transmit a service to the backbone network. A transmission process may be as follows:

Operation 505: The terminal sends a first service packet to the vBNG-UP device, where the first service packet includes the private address of the terminal and a service type to which the first service packet belongs.

The first service packet is a service packet that needs to be sent by the terminal to the backbone network.

A source address of the first service packet is the private address of the terminal, the first service packet belongs to a service that needs to be transmitted by the terminal, and the service type in the first service packet is a type of the service. In addition, the first service packet is a service packet sent for the first time after the network connection between the terminal and the backbone network is established.

Operation 506: The vBNG-UP device receives the first service packet, and sends the first service packet to a centralized address translation device.

In operation 506, the vBNG-UP device receives the first service packet, and sends the first service packet to an MC. The MC receives the first service packet, and sends the first service packet to the centralized address translation device based on the private address of the terminal included in the first service packet.

The MC saves a routing policy, where the routing policy includes the range of private addresses on which address translation needs to be performed, and the routing policy indicates that a service packet that is sent by the terminal and that belongs to the range of private addresses is forwarded to the centralized address translation device. Therefore, in operation 506, the MC receives the first service packet, determines whether the private address of the terminal included in the first service packet belongs to the private address range; sends, if the private address belongs to the range of private addresses, the first service packet to the centralized address translation device; and sends, if the private address does not belong to the range of private addresses, the first service packet to the backbone network.

Operation 507: The centralized address translation device receives the first service packet, and generates, if address translation information of the terminal does not exist in generated address translation information, the address translation information of the terminal, where the address translation information includes the private address of the terminal, a public address, and a port number range of the public address.

In operation 507, the centralized address translation device receives the first service packet, and queries, from the generated address translation information, whether the address translation information including the private address of the terminal exists, where the address translation information including the private address of the terminal is the address translation information of the terminal. If it is found that the address translation information including the private address of the terminal does not exist, a spare public address is selected from a public address pool, and a plurality of ports are selected from spare ports corresponding to the public address, to obtain the address translation information of the terminal, where the address translation information includes the private address, the public address, and a port number range, and the port number range includes a port number of each port in the plurality of ports.

The public address pool is a public address pool included in the centralized address translation device.

Operation 508: The centralized address translation device translates an address of the first service packet based on the address translation information of the terminal, to obtain a second service packet, and sends the second service packet to the MC, where the second service packet includes the public address of the terminal, a port number of the service to which the first service packet belongs, and a part of the first service packet except the private address.

The first service packet further includes a service type of the service to which the first service packet belongs. In operation 508, the centralized address translation device selects, from the port number range, a port number for the service to which the first service packet belongs as the port number of the service; replaces the private address in the first service packet with the public address of the terminal and the port number of the service to which the first service packet belongs, to obtain the second service packet; and sends the second service packet to the MC. The MC receives the second service packet, and sends the second service packet to the backbone network.

In an embodiment, the centralized address translation device may further save a correspondence among the private address of the terminal, the service type, the public address of the terminal, and the port number of the service in an address translation mapping relationship.

In operation 507, if the generated address translation information includes the address translation information of the terminal, the centralized address translation device translates the address of the first service packet. The translation process may be as follows:

The centralized address translation device queries the address translation mapping relationship based on the private address and the service type that are included in the first service packet. If no corresponding public address and port number are found in the address translation mapping relationship, it is determined that the first service packet is a start packet belonging to the service, a spare port number is selected from the port number range included in the address translation information of the terminal as the port number of the service, and the public address of the terminal is obtained from the address translation information of the terminal. The private address in the first service packet is replaced with the public address of the terminal and the port number of the service, to obtain the second service packet, and the second service packet is sent to the MC. The centralized address translation device further saves the correspondence among the private address of the terminal, the service type of the service, the public address of the terminal, and the port number of the service in the address translation mapping relationship.

If the corresponding public address and port number are found in the address translation mapping relationship, the public address of the terminal and the port number of the service are obtained, and it is determined that the first service packet is a non-start packet belonging to the service, that is, the first service packet may be a second service packet, a third service packet, . . . , or the like belonging to the service. The private address in the first service packet is replaced with the public address of the terminal and the port number of the service, to obtain the second service packet, and the second service packet is sent to the MC.

In an embodiment, the MC further receives a third service packet that belongs to the service and that is sent by the backbone network, where a destination address of the third service packet is the public address of the terminal, and a destination port number is the port number of the service to which the third service packet belongs; and sends the third service packet to the centralized address translation device.

The centralized address translation device receives the third service packet; translates an address of the third service packet, to obtain a fourth service packet, where the fourth service packet includes the public address of the terminal and a part of the third service packet except the public address of the terminal and the port number of the service; and sends the fourth service packet to the MC. The MC receives the fourth service packet, and sends the fourth service packet to the vBNG-UP device. The vBNG-UP device receives the fourth service packet, and sends the fourth service packet to the terminal.

An operation of which the centralized address translation device translates the address of the third service packet may be that: the centralized address translation device queries, based on the public address of the terminal and the port number of the service that are included in the third service packet, the private address of the terminal from the address translation mapping relationship, and replaces the public address of the terminal and the port number of the service in the third service packet with the private address of the terminal, to obtain the fourth service packet.

When generating the address translation information of the terminal, the centralized address translation device further performs an operation of the following operation 510.

Operation 509: The centralized address translation device sends a third node report request to the vBNG-CP device, where the third node report request includes the address translation information of the terminal.

There is no execution sequence between operation 508 and operation 509. That is, operation 508 may be performed before operation 509, or operation 509 may be performed before operation 508, or operation 508 and operation 509 are performed simultaneously.

The third node report request includes an address translation user information field, and the address translation user information field includes the address translation information of the terminal.

The third node report request may be a message obtained by extending a field on a basis of a node report request defined in a PFCP protocol, where the extended field is the address translation user information field.

The third node report request includes a node report type. The node report type may be shown in Table 2. The node report type includes a flag bit CUI, and the CUI indicates that the extended field in the third node report request is the address translation user information field.

In an embodiment, a value of the CUI may be set to a value 1 or 0, and the value 1 or 0 represents that the CUI indicates that the extended field in the third node report request is the address translation user information field.

So far, meanings respectively indicated by flag bits CUI, CARR, and CAAR in the node report type may be obtained. That is, the CAAR indicates that the field extended in the node report request is an address pool allocate request field, the CARR indicates that the field extended in the node report request is an address pool release request field, and the CUI indicates that the field extended in the node report request is the address translation user information field.

For the foregoing address translation user information field, refer to the following Table 9. The address translation user information field may include a plurality of sub-fields such as a field type, a field length, a public address field, a private address field, and a port number range field. The field type carries a type of the address translation user information field, the field length carries a length of the address translation user information field, the private address field carries the private address of the terminal, the public address field carries the public address of the terminal, and the port number range field carries the port number range.

TABLE 9

Field type (1 to 2) Type of the field allocate request field = NN (decimal)
Field length (3 to 4) Length = n

| IE name | P | Condition/Comment | IE type |
|---|---|---|---|
| Private address field | M | Private address in the address translation information of the terminal | Private address of the terminal. |
| Public address field | M | Public address in the address translation information of the terminal | Public address of the terminal |
| Port number range field | M | Port number range in the address translation information of the terminal | Port number range of the terminal |

For the foregoing private address field, refer to the following Table 10. The private address field may include a plurality of sub-fields such as a field type, a field length, a flag field, an address field, and an extensible field. The field type carries a type of the private address field, the field length carries a length of the private address field, the flag field includes flag bits Spare, chose (CH), V4, and V6, and the address field carries the private address of the terminal.

The private address of the terminal may be an Internet protocol version 4 (IPv4) address or an Internet protocol version 6 (IPv6) address, and the flag bit CH indicates whether the private address of the terminal is the IPv4 address or the IPv6 address.

TABLE 10

| Octet | 8 | 7 | 6 | 5 | 4 | 3 | 2 | 1 |
|---|---|---|---|---|---|---|---|---|
| Field type (1 to 2) | | | | Type = XX (decimal) | | | | |
| Field length (3 to 4) | | | | Length = n | | | | |
| Flag field (5) | | | Spare | | | CH | V4 | V6 |
| Address field | | | | IPv4 address | | | | |
| | | | | IPv6 address | | | | |
| | | | | Mask length | | | | |
| Extensible field | | | These octet(s) is/are present only when explicitly specified. | | | | | |

For the foregoing public address field, refer to the following Table 11. The public field may include a plurality of sub-fields such as a field type, a field length, a flag field, an address field, and an extensible field. The field type carries a type of the public address field, the field length carries a length of the public address field, the flag field includes Spare, CH, V4, and V6, and the address field carries the public address of the terminal.

The public address of the terminal may be an IPv4 address or an IPv6 address, and the flag bit CH indicates whether the public address of the terminal is the IPv4 address or the IPv6 address.

TABLE 11

| Octet | 8 | 7 | 6 | 5 | 4 | 3 | 2 | 1 |
|---|---|---|---|---|---|---|---|---|
| Field type (1 to 2) | | | | Type = XX (decimal) | | | | |
| Field length (3 to 4) | | | | Length = n | | | | |
| Flag field (5) | | | Spare | | | CH | V4 | V6 |
| Address field | | | | IPv4 address | | | | |
| | | | | IPv6 address | | | | |
| | | | | Mask length | | | | |
| Extensible field | | | These octet(s) is/are present only when explicitly specified. | | | | | |

Operation 510: The vBNG-CP device receives the third node report request, and saves a translation log, where the translation log includes the device information of the terminal and the address translation information.

In operation 510, the vBNG-CP device receives the third node report request, where the third node report request includes the address translation information; obtains, based on the private address of the terminal included in the address translation information, the device information of the terminal from the correspondence between the private address and the device information; and saves the translation log, where the translation log includes the device information of the terminal and the address translation information.

The vBNG-CP device may send the translation log to a log server. The log server receives and saves the translation log.

The vBNG-CP device further sends a third node report response to the centralized address translation device.

The translation log may be a Radius log.

The vBNG-CP device generates the translation log. In this way, a function of generating the translation log by the vBNG-CP device is reused, and the log server does not need to be separately deployed, thereby reducing costs.

In this embodiment of this application, a centralized address translation device is provided with a public address pool. When address translation information needs to be generated for a terminal, the centralized address translation device receives a first service packet that is from the terminal and that is forwarded by a vBNG-UP device, where the first service packet is a service packet sent by the terminal for the first time, and the first service packet includes a private address of the terminal. The centralized address translation device selects, from a public address pool included in the centralized address translation device, a public address for the terminal, and obtains a port number range corresponding to the public address, to obtain the address translation information of the terminal, where the address translation information includes the private address of the terminal, the public address, and the port number range. After obtaining the address translation information of the terminal, the centralized address translation device translates an address of the first service packet by using the address translation information of the terminal, and then forwards a second service packet obtained by translation. The centralized address translation device is provided with the public address pool and a port number corresponding to each public address in the public address pool. Therefore, the centralized address translation device has a function of managing the public address pool and/or the port number, a function of generating the address translation information, and an address translation function, that is, the three functions are integrated into one centralized address translation device for execution. In this way, the centralized address translation device does not need to exchange a large quantity of standardized interface messages with a vBNG-CP device, so that a large quantity of network resources are saved. In addition, because the three functions are integrated into the centralized address translation device, the centralized address translation device generates the address translation information of the terminal by using a new method, and a new manner of obtaining the address translation information is provided; and the centralized address translation device translates an address of a service packet forwarded by each vBNG-UP device, thereby implementing a centralized address translation function.

Figure 6:
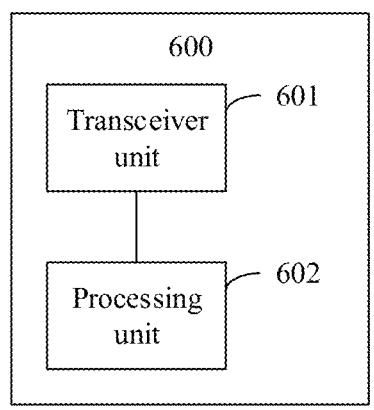
FIG. 6 is a schematic diagram of a structure of an address management apparatus according to an embodiment of this application.

Refer to FIG. 6. An embodiment of this application provides an address management apparatus 600. The apparatus 600 is deployed on the vBNG-UP device or the centralized address translation device provided in any one of the foregoing embodiments. The apparatus 600 is applied to a virtual broadband gateway vBNG whose user plane and control plane are separated. The apparatus 600 is located on a user plane, and includes:

a transceiver unit 601, configured to receive a first packet, where the first packet includes a private address of a terminal, and the apparatus 600 is provided with a public address pool and/or a port number corresponding to each public address in the public address pool; and a processing unit 602, configured to generate address translation information of the terminal, where the address translation information of the terminal includes the private address, a public address in the public address pool, and a port number range, the address translation information of the terminal is used by the apparatus 600 to translate an address of a service packet, and the service packet is a packet from the terminal or a packet to be sent to the terminal.

In an embodiment, for a detailed process of generating the address translation information by the processing unit 602, refer to related content in operation 405 in the embodiment shown in FIG. 4 and operation 505 in the embodiment shown in FIG. 5A and FIG. 5B. Details are not described herein again.

In an embodiment, the apparatus 600 is a virtual broadband network gateway user plane vBNG-UP device, and the processing unit 602 is further configured to apply for the public address pool to a vBNG-CP device.

In an embodiment, for a detailed process of applying for the public address pool by the processing unit 602, refer to related content in operation 401 and operation 402 in the embodiment shown in FIG. 4. Details are not described herein again.

In an embodiment, the transceiver unit 601 is further configured to:

send a node report request to the vBNG-CP device, where the node report request includes an identifier of the public address pool; and receive a node report response sent by the vBNG-CP device, where the node report response includes the public address pool.

In an embodiment, the first packet further includes a translation identifier; and the processing unit 602 is configured to generate the address translation information of the terminal based on an indication of the translation identifier.

In an embodiment, for a detailed process of generating the address translation information by the processing unit 602, refer to related content in operation 405 in the embodiment shown in FIG. 4. Details are not described herein again.

In an embodiment, the transceiver unit 601 is further configured to:

send a release request to the vBNG-CP device, where the release request includes the public address pool, and the release request is used by the vBNG-CP device to reclaim the public address pool.

In an embodiment, the apparatus 600 is a centralized address translation device, and the first packet is a service packet that is from the terminal and that is forwarded by a virtual broadband network gateway user plane vBNG-UP device.

In an embodiment, the transceiver unit 601 is further configured to:

send a second packet to the vBNG-CP device, where the second packet includes the address translation information of the terminal, the second packet is used by the vBNG-CP device to save a translation log, and the translation log includes device information of the terminal and the address translation information of the terminal.

In this embodiment of this application, an apparatus 600 is provided with a public address pool and/or a port number corresponding to each public address in the public address pool, and a processing unit 602 generates address translation information of a terminal and translates an address of a service packet. Therefore, the apparatus 600 has a function of managing the public address pool and/or the port number, a function of generating the address translation information, and an address translation function, that is, the three functions are integrated into one apparatus for execution. In this way, a transceiver unit 601 does not need to exchange a large quantity of standardized interface messages with the vBNG-CP device, so that a large quantity of network resources are saved. In addition, because the three functions are integrated into the apparatus 600, the apparatus 600 generates the address translation information of the terminal by using a new method, and a new manner of obtaining the address translation information is provided.

Figure 7:
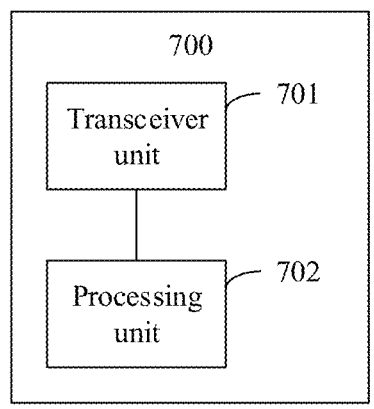
FIG. 7 is a schematic diagram of a structure of another address management apparatus according to an embodiment of this application.

Refer to FIG. 7. An embodiment of this application provides an address management apparatus 700. The apparatus 700 is deployed on the vBNG-CP device provided in any one of the foregoing embodiments. The apparatus 700 is applied to a virtual broadband gateway vBNG whose user plane and control plane are separated. The apparatus 700 is located on a control plane, and includes:

a transceiver unit 701, configured to receive a second packet sent by a user plane device, where the second packet includes address translation information of a terminal, the user plane device is provided with a public address pool and/or a port number corresponding to each public address in the public address pool, the address translation information of the terminal includes a private address of the terminal, a public address in the public address pool, and a port number range, and the user plane device is located on the user plane; and a processing unit 702, configured to save a translation log, where the translation log includes device information of the terminal and the address translation information of the terminal.

In an embodiment, for a detailed process of saving the translation log by the processing unit 702, refer to related content in operation 407 in the embodiment shown in FIG. 4 and operation 508 in the embodiment shown in FIG. 5A and FIG. 5B. Details are not described herein again.

In an embodiment, the transceiver unit 701 is further configured to:

receive a node report request sent by the user plane device, where the node report request includes an identifier of the public address pool; and send a node report response to the user plane device, where the node report response includes the public address pool.

In an embodiment, the transceiver unit 701 is further configured to:

receive a release request sent by the user plane device, where the release request includes the identifier of the public address pool; and the processing unit 702 is further configured to reclaim the public address pool.

In this embodiment of this application, a transceiver unit receives address translation information of a terminal sent by a user plane device. In this way, a processing unit can obtain a translation log including device information of the terminal and the address translation information of the terminal, so that a function of generating the translation log by an apparatus can be reused, and a log server does not need to be separately disposed, thereby reducing costs.

Figure 8:
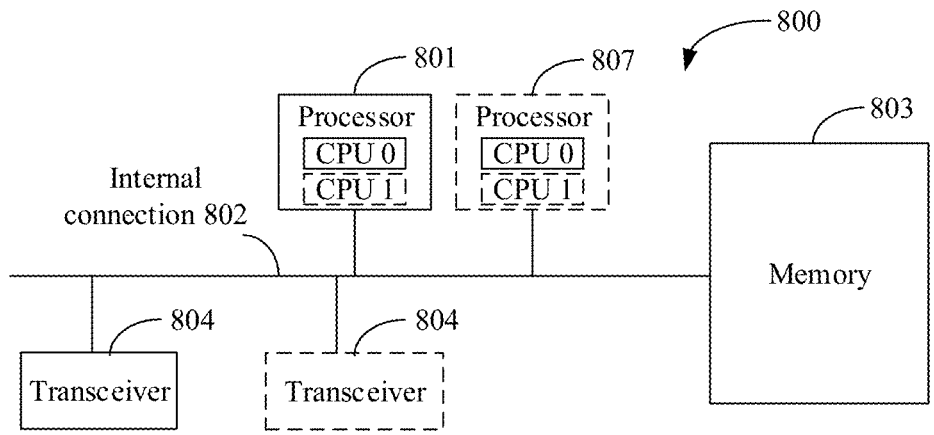
FIG. 8 is a schematic diagram of a structure of another address management apparatus according to an embodiment of this application.

FIG. 8 is a schematic diagram of an address management apparatus 800 according to an embodiment of this application. The apparatus 800 may be the vBNG-UP device or the centralized address translation device in any one of the foregoing embodiments. The apparatus 800 includes at least one processor 801, an internal connection 802, a memory 803, and at least one transceiver 804.

The apparatus 800 is an apparatus of a hardware structure, and may be configured to implement function modules in the apparatus 600 in FIG. 6. For example, a person skilled in the art may figure out that the processing unit 602 in the apparatus 600 shown in FIG. 6 may be implemented by the at least one processor 801 by invoking code in the memory 803, and the transceiver unit 601 in the apparatus 600 shown in FIG. 6 may be implemented by the transceiver 804.

In an embodiment, the apparatus 800 may be further configured to implement a function of the vBNG-UP device or the centralized address translation device in any one of the foregoing embodiments.

In an embodiment, the processor 801 may be a general-purpose central processing unit (central processing unit, CPU), a network processor (network processor, NP), a microprocessor, an application-specific integrated circuit (application-specific integrated circuit, ASIC), or one or more integrated circuits configured to control program execution of the solutions of this application.

The internal connection 802 may include a path for transmitting information between the foregoing components. In an embodiment, the internal connection 802 is a board, a bus, or the like.

The transceiver 804 is configured to communicate with another device or a communication network.

The memory 803 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage medium, an optical disc storage medium (including a compact disc, a laser disc, an optical disc, a digital versatile disc, a Blu-ray optical disc, or the like), a magnetic disk storage medium or another magnetic storage device, or any other medium that can carry or store expected program code in a form of an instruction or a data structure and that can be accessed by a computer, but the memory 803 is not limited thereto. The memory may exist independently, and is connected to the processor through the bus. The memory may alternatively be integrated with the processor.

The memory 803 is configured to store application program code that executes the solution in this application, and the processor 801 controls execution of the solution in this application. The processor 801 is configured to execute the application program code stored in the memory 803, and cooperate with the at least one transceiver 804, so that the apparatus 800 implements functions in the method in this patent.

In an embodiment, the processor 801 may include one or more CPUs, for example, a CPU 0 and a CPU 1 in FIG. 8.

In an embodiment, the apparatus 800 may include a plurality of processors, for example, the processor 801 and a processor 807 in FIG. 8. Each of the processors may be a single-core (single-CPU) processor, or may be a multi-core (multi-CPU) processor. The processor herein may be one or more devices, circuits, and/or processing cores configured to process data (for example, computer program instructions).

Figure 9:
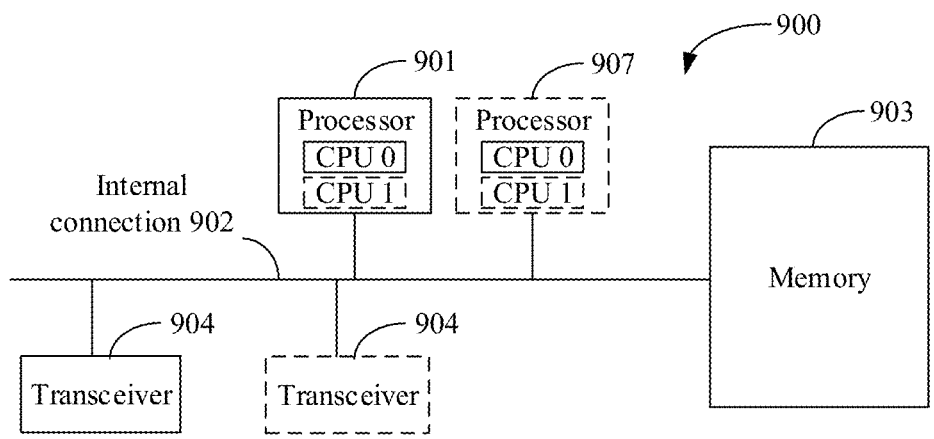
FIG. 9 is a schematic diagram of a structure of another address management apparatus according to an embodiment of this application.

FIG. 9 is a schematic diagram of an address management apparatus 900 according to an embodiment of this application. The apparatus 900 may be the vBNG-CP device in any one of the foregoing embodiments. The apparatus 900 includes at least one processor 901, an internal connection 902, a memory 903, and at least one transceiver 904.

The apparatus 900 is an apparatus of a hardware structure, and may be configured to implement function modules in the apparatus 700 in FIG. 7. For example, a person skilled in the art may figure out that the processing unit 702 in the apparatus 700 shown in FIG. 7 may be implemented by the at least one processor 901 by invoking code in the memory 903, and the transceiver unit 701 in the apparatus 700 shown in FIG. 7 may be implemented by the transceiver 904.

In an embodiment, the apparatus 900 may be further configured to implement a function of the vBNG-CP device in any one of the foregoing embodiments.

In an embodiment, the processor 901 may be a general-purpose central processing unit (central processing unit, CPU), a network processor (NP), a microprocessor, an application-specific integrated circuit (ASIC), or one or more integrated circuits configured to control program execution of the solutions of this application.

The internal connection 902 may include a path for transmitting information between the foregoing components. In an embodiment, the internal connection 902 is a board, a bus, or the like.

The transceiver 904 is configured to communicate with another device or a communication network.

The memory 903 may be a ROM or another type of static storage device that can store static information and instructions, a RAM or another type of dynamic storage device that can store information and instructions, an EEPROM, a CD-ROM or another compact disc storage medium, an optical disc storage medium (including a compact disc, a laser disc, an optical disc, a digital versatile disc, a Blu-ray optical disc, or the like), a magnetic disk storage medium or another magnetic storage device, or any other medium that can carry or store expected program code in a form of an instruction or a data structure and that can be accessed by a computer, but the memory 903 is not limited thereto. The memory may exist independently, and is connected to the processor through the bus. The memory may alternatively be integrated with the processor.

The memory 903 is configured to store application program code that executes the solution in this application, and the processor 901 controls execution of the solution in this application. The processor 901 is configured to execute the application program code stored in the memory 903, and cooperate with the at least one transceiver 904, so that the apparatus 900 implements functions in the method in this patent.

During specific implementation, in an embodiment, the processor 901 may include one or more CPUs, for example, a CPU 0 and a CPU 1 in FIG. 9.

In an embodiment, the apparatus 900 may include a plurality of processors, for example, the processor 901 and a processor 907 in FIG. 9. Each of the processors may be a single-core (single-CPU) processor, or may be a multi-core (multi-CPU) processor. The processor herein may be one or more devices, circuits, and/or processing cores configured to process data (for example, computer program instructions).

Figure 10:
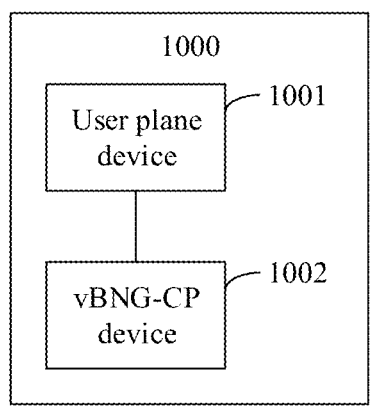
FIG. 10 is a schematic diagram of a structure of an address management system according to an embodiment of this application.

Refer to FIG. 10. An embodiment of this application provides an address management system 1000. The system 1000 includes the apparatus 600 shown in FIG. 6 and the apparatus 700 shown in FIG. 7, or the system 1000 includes the apparatus 800 shown in FIG. 8 and the apparatus 900 shown in FIG. 9.

Refer to FIG. 10. The apparatus 600 shown in FIG. 6 or the apparatus 800 shown in FIG. 8 is a user plane device 1001, and the apparatus 700 shown in FIG. 7 or the apparatus 900 shown in FIG. 9 is a vBNG-CP device 1002.

A person of ordinary skill in the art may understand that all or some of the operations of the embodiments may be implemented by hardware or a program instructing related hardware. The program may be stored in a computer-readable storage medium. The storage medium may be a read-only memory, a magnetic disk, an optical disc, or the like.

The foregoing descriptions are only embodiments of this application, but are not intended to limit this application. Any modification, equivalent replacement, or improvement made within the concept and principle of this application should fall within the protection scope of this application.

What is claimed is:

1. A network device for a user plane (UP) device, the network device comprising:
   at least one processor;
   one or more memories coupled to the at least one processor and storing programming instructions, which when executed by the at least one processor, cause the network device to:
   receive a first packet comprising a private address of a terminal, wherein the UP device is provided with a public address pool or a port number corresponding to each public address in the public address pool; and
   generate address translation information of the terminal, wherein the address translation information of the terminal comprises the private address, a public address in the public address pool, and a port number range, the address translation information of the terminal is used by the UP device to translate an address of a service packet, and the service packet is a packet from the terminal or a packet to be sent to the terminal;
   wherein the UP device is in a virtual broadband gateway (vBNG) in which a UP and a control plane (CP) are separated.

2. The network device according to claim 1, wherein the programming instructions, when executed by the at least one processor, further cause the network device to:
   apply for the public address pool to a CP device in the vBNG.

3. The network device according to claim 2, wherein the programming instructions, when executed by the at least one processor, further cause the network device to:
   send a node report request to the CP device, wherein the node report request comprises an identifier of the public address pool; and
   receive a node report response from the CP device, wherein the node report response comprises the public address pool.

4. The network device according to claim 2,
   wherein the first packet further comprises a translation identifier, and
   wherein the programming instructions, when executed by the at least one processor, further cause the network device to:
   generate the address translation information of the terminal based on an indication of the translation identifier.

5. The network device according to claim 2, wherein the programming instructions, when executed by the at least one processor, further cause the network device to:
   send a release request to the CP device, wherein the release request comprises the public address pool, and the release request is used by the CP device to reclaim the public address pool.

6. The network device according to claim 1, wherein the UP device is a centralized address translation device.

7. The network device according to claim 1, wherein the programming instructions, when executed by the at least one processor, further cause the network device to:
   send a second packet to the CP device, wherein the second packet comprises the address translation information of the terminal, the second packet is used by the CP device to save a translation log that comprises device information of the terminal and the address translation information of the terminal.

8. A network device for a control plane (CP) device, the network device comprising:
   at least one processor;
   one or more memories coupled to the at least one processor and storing programming instructions, which when executed by the at least one processor, cause the network device to:
   receive a second packet from a user plane (UP) device in a virtual broadband gateway (vBNG), wherein the second packet comprises address translation information of a terminal, the UP device is provided with a public address pool or a port number corresponding to each public address in the public address pool, the address translation information of the terminal comprises a private address of the terminal, a public address in the public address pool, and a port number range; and
   save a translation log that comprises device information of the terminal and the address translation information of the terminal;
   wherein the CP device is in the vBNG in which a UP and a CP are separated.

9. The network device according to claim 8, wherein the programming instructions, when executed by the at least one processor, further cause the network device to:

receive a node report request from the UP device, wherein the node report request comprises an identifier of the public address pool; and send a node report response to the UP device, wherein the node report response comprises the public address pool.

10. The network device according to claim 9, wherein the programming instructions, when executed by the at least one processor, further cause the network device to:

receive a release request from the UP device, wherein the release request comprises the identifier of the public address pool; and reclaim the public address pool.

11. A network system for a virtual broadband gateway (vBNG) comprising a user plane (UP) device and a control plane (CP) device, the UP device comprising:

at least one processor;

one or more memories coupled to the at least one processor and storing programming instructions, which when executed by the at least one processor, cause the UP device to:

receive a first packet comprising a private address of a terminal, wherein the UP device is provided with a public address pool or a port number corresponding to each public address in the public address pool; and generate address translation information of the terminal, wherein the address translation information of the terminal comprises the private address, a public address in the public address pool, and a port number range, the address translation information of the terminal is used by the UP device to translate an address of a service packet, and the service packet is a packet from the terminal or a packet to be sent to the terminal;

wherein a UP and a CP in the vBNG are separated.

12. The network system according to claim 11, wherein the programming instructions, when executed by the at least one processor, further cause the UP device to:

apply for the public address pool to the CP device in the vBNG.

13. The network system according to claim 12, wherein the programming instructions, when executed by the at least one processor, further cause the UP device to:

send a node report request to the CP device, wherein the node report request comprises an identifier of the public address pool; and receive a node report response from the CP device, wherein the node report response comprises the public address pool.

14. The network system according to claim 12, wherein the first packet further comprises a translation identifier, and wherein the programming instructions, when executed by the at least one processor, further cause the UP device to:

generate the address translation information of the terminal based on an indication of the translation identifier.

15. The network system according to claim 12, wherein the programming instructions, when executed by the at least one processor, further cause the UP device to:

send a release request to the CP device, wherein the release request comprises the public address pool, and the release request is used by the CP device to reclaim the public address pool.

16. The network system according to claim 11, wherein the UP device is a centralized address translation device.

17. The network system according to claim 11, wherein the programming instructions, when executed by the at least one processor, further cause the UP device to:

send a second packet to the CP device, wherein the second packet comprises the address translation information of the terminal, the second packet is used by the CP device to save a translation log that comprises device information of the terminal and the address translation information of the terminal.

18. The network system according to claim 11, wherein the CP device comprises:

at least one processor;

one or more memories coupled to the at least one processor and storing programming instructions, which when executed by the at least one processor, cause the CP device to:

receive a second packet from the UP device, wherein the second packet comprises address translation information of a terminal, the UP device is provided with a public address pool or a port number corresponding to each public address in the public address pool, the address translation information of the terminal comprises a private address of the terminal, a public address in the public address pool, and a port number range; and save a translation log that comprises device information of the terminal and the address translation information of the terminal.

19. The network system according to claim 11, wherein the programming instructions, when executed by the at least one processor, further cause the CP device to:

receive a node report request from the UP device, wherein the node report request comprises an identifier of the public address pool; and send a node report response to the UP device, wherein the node report response comprises the public address pool.

20. The network system according to claim 19, wherein the programming instructions, when executed by the at least one processor, further cause the CP device to:

receive a release request from the UP device, wherein the release request comprises the identifier of the public address pool; and reclaim the public address pool.

* * * * *